United States Patent Office 3,254,116
Patented May 31, 1966

3,254,116
D-NORANDROSTANES
Jerrold Meinwald, Ithaca, N.Y., assignor to Schering Corporation, Bloomfield, N.J., a corporation of New Jersey
No Drawing. Filed Feb. 25, 1965, Ser. No. 435,323
6 Claims. (Cl. 260—488)

This application is a continuation-in-part of copending application Serial No. 165,952 of Jerrold Meinwald, filed January 12, 1962, now abandoned.

This invention relates to a new class of steroidal derivatives, to methods for their manufacture, and to novel intermediates produced thereby. More specifically, this invention relates to D-nor-steroids of the androstane series which have useful, therapeutic properties, to processes for their preparation, and to D-nor-steroidal intermediates produced thereby.

The D-nor-steroids of my invention possess a carbon-skeleton ring system as shown in Formula I:

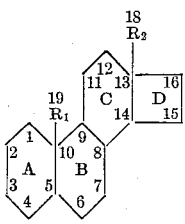

The rings are identified in the manner of conventional steroid nomenclature. Similarly, the carbon atoms of rings A, B, and C are conventionally identified. In ring D, C–17 is eliminated whereby C–16 is directly bonded to C–13. The angular groups attached to positions 10 and 13 retain conventional numbering and, as shown, $R_1$ and $R_2$ represent methyl or hydrogen.

In the conventional steroid nucleus, the six-membered C-ring is fused to the five-membered D-ring in the trans configuration. The D-nor-steroids of the instant invention also possess the trans configuration between the C-ring and the now contracted D-ring.

Heretofore, steroids having a 4-membered cyclic D-ring were unknown. By my invention it is now possible to prepare a new class of 4-membered D-ring steroids (i.e. D-nor-androstanes), which are characterized by being devoid of a 17-carbon atom and by having attached to the 16-carbon atom, moieties which are identical to those substituted at C–17 of a normal steroid possessing a 5-membered D-ring. My D-nor-steroids include D-nor-androstanes having at the 16-carbon atom a substituent possessing an oxygen function.

This invention thus provides a new class of D-nor-steroids including D-nor-androstanes defined by the following formula:

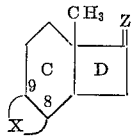

wherein Z is a member selected from the group consisting of keto (H, β-hydroxy) and (H, β-lower alkanoyloxy); and X is an A and B-ring selected from the group consisting of:

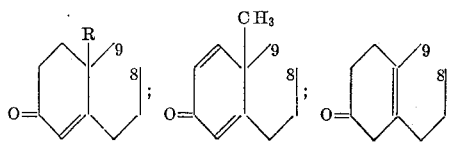

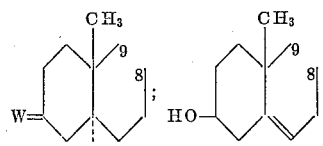

and

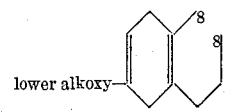

wherein R is a member selected from the group consisting of hydrogen and methyl; and W is a member selected from the group consisting of keto (H, βOH) and (H, αOH).

Representative of the lower alkanoate esters contemplated are those having up to 8 carbon atoms including those such as formate, propionate, acetate, and butyrate.

By lower alkyl is contemplated hydrocarbon residues having up to 4 carbon atoms, thus including methyl, ethyl, n-propyl, isopropyl, n-butyl, sec-butyl and tertiary butyl.

In this specification and in the claims, the term "D-nor-androstane," in addition to including saturated compounds, i.e. those D-nor-steroids possessing a completely saturated cyclobutanophenanthrene ring system, include those D-nor-steroids having unsaturations in one or more of rings A, B, C, and D.

The 16-keto- and 16β-hydroxy-D-nor-androstanes defined by the above formula, are valuable mainly as intermediates in preparing other D-nor-androstanes such as those having unsaturations at C–6, i.e. the 6-dehydro and 1,6-bis-dehydro analogs having at C–16 a member of the group consisting of (β-hydroxy, α-lower alkyl), (β-hydroxy, α-ethinyl), (β-hydroxy, α-chloroethinyl), (β-hydroxy, α-propinyl), and the lower alkanoate esters of the foregoing. My D-nor-androstanes are also valuable in preparing therapeutically active D-nor-estratrienes as described herein below.

For example, D-nor-androstane-3β,16β-diol upon oxidation with chromic acid in pyridine yields D-nor-androstane-3,16-dione which, in turn, may be brominated with bromine in acetic acid followed by dehydrobromination with dimethylacetamide to yield D-nor-1,4-androstadiene-3,16-dione. Upon pyrolysis of the afore-mentioned D-nor-androstadienedione at about 550° C., there is formed D-nor-estrone which is converted to the corresponding methyl ether via known methods to give the pharmacologically active D-nor-estrone methyl ether described and claimed in my co-pending application Serial No. 165,952, filed January 12, 1962. In turn, D-nor-estrone methyl ether (prepared from D-nor-androstane-3β,16β-diol as described above) upon reduction with sodium borohydride yields D-nor-estradiol or, when reduced with lithium in ammonia, yields 3-methoxy-D-nor-19-nor-2,5(10)-androstadiene-16β-ol convertible upon treatment with oxalic acid to D-nor-19-nor-5(10)-androstene-16β-ol-3-one, a compound of this invention having anti-fertility properties. Alternatively, the D-nor-1,3,5(10)-estratrienes are prepared by the 1,2-dehydrogenation of a 3-keto-Δ⁴-D-nor-19-nor-androstane of this invention. Thus, for example, D-nor-19-nor-testosterone (prepared as described in Examples 5 and 17) when subjected to the action of a 1,2-dehydrogenating microorganism such as *Corynebacterium simplex* (A.T.C.C. 6946) yields D-nor-estradiol (D-nor-1,3,5(10)-estrateriene-3,16β-diol).

This invention thus provides for the following specific D-nor-androstanes:

(1) D-nor-testosterone (D-nor-4-androstene-16β-ol-3-one), the 16-acetate and the 16-propionate esters thereof, (2) D-nor-19-nor-testosterone, and the 16-acetate ester thereof,
    (3) D-nor-19-nor-4-androstene-3,16-dione,
    (4) D-nor-1-dehydrotestosterone,
    (5) D-nor-4-androstene-3,16-dione,
    (6) D-nor-1,4-androstadiene-3,16-dione,
    (7) D-nor-19-nor-4-androstene-3,16-dione,
    (8) D-nor-androstane-3,16-dione,
    (9) D-nor-19-nor-5(10)-androstene-16β-ol-3-one,
    (10) D-nor-androstane-3β,16β-diol,
    (11) D-nor-androstane-3α-ol-17-one,
    (12) 3 - methoxy-D-nor-19-nor-2,5(10)-androstadiene-16β-ol,
    (13) 16α-methyl-D-nor-testosterone and the 19-nor-analog thereof,
    (14) 16α-ethinyl-D-nor-testosterone,
    (15) 16α-ethinyl-D-nor - 1 - dehydrotestosterone (16α-ethinyl-D-nor-1,4-androstadiene-16α-ol-3-one),
    (16) 16α - ethinyl-D-nor-19-nor-5(10)-androstene-16β-ol-3-one.

The D-nor-androstanes of this invention are prepared from 16β-carboxy-D-nor-steroids such as D-nor-androstane-3β-ol-16β-carboxylic acid and D-nor-5-androstene-3β-ol-16β-carboxylic acid by employing techniques analogous to methods known in the art for converting the carboxylic acid moiety in a C–17 carboxylic acid steroid (e.g. 5-androstene-3β-ol-17β-carboxylic acid) to a 17-keto, 17-hydroxy of known, normal, cyclopentyl-D-ring steroids.

The 16β-carboxy-D-nor-steroids, necessary intermediates for the preparation of the novel D-nor-androstanes of this invention, are prepared from 17-ketone androstanes and 17-keto-estranes unsubstituted in the 16-position via my novel process as described in my U.S. Patent No. 3,113,142. In brief, my process is represented by the following reaction scheme A, wherein R represents the A, B, and C-rings of a steroid:

(A)

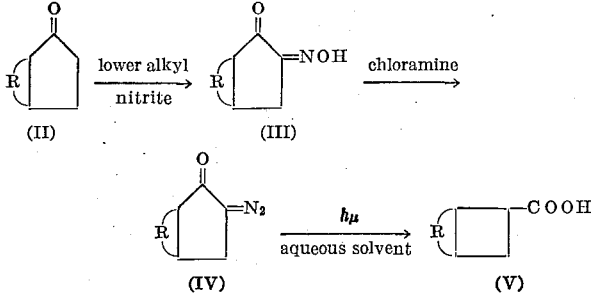

Exemplary of 16β-carboxy-D-nor starting compounds prepared as indicated above are D-nor-androstane-3β-ol-16β-carboxylic acid, D-nor-androstane-3α-ol-16β - carboxylic acid, D-nor-androstane-3-one-16β-carboxylic acid, D-nor-4-androstene-3-one-16β-carboxylic acid, D-non-5-androstene-3β-ol-16β-carboxylic acid, D-nor-4-androstene-3,11-dione-16β-carboxylic acid, D-nor-4-androstene-11β-ol-one-16β-carboxylic acid, D-nor-1,4-androstadiene-3,11-dione-16β-carboxylic acid, D-nor-1,4,9(11)-androstadiene-3-one-16β-carboxylic acid, 9α-fluoro-D-nor - 1,4 - androstadiene-11β-ol-3-one-16β-carboxylic acid, 6α-methyl-D-nor-1,4-androstadiene-3,11-dione-16β-carboxylic acid, 6α-fluoro-D-nor-1,4-androstadiene-3,11-dione - 16β - carboxylic acid and the like.

As mentioned heretofore, the D-nor-androstanes of this invention are produced from 16β-carboxy-D-nor-androstanes such as those listed above by utilizing transformations similar to those used in known conversions involving C–17 cyclopentanoid-D-ring steroid structures. For example, in preparing D-nor-testosterone, the 16-carboxyl group is converted to a hydroxyl group by known techniques. For example, starting with 3β-hydroxy-16β-carboxy-D-nor-5-androstene, after protecting the hydroxyl group at C–3 by ester formation, the D-nor-16β-carboxy steroidal starting compound is first converted to the corresponding acid chloride by treatment with a reagent such as thionyl chloride, phosphorous trichloride, phosphorous pentachloride, and preferably, oxalyl chloride. The thus formed acid chloride, e.g. 3β-acyloxy-16β-carbonyl chloride-D-nor-5-androstene, is, in turn, treated with an alkylating agent such as dimethyl cadmium, giving rise, after hydrolysis of the ester at C–3, to the intermediary D-nor-steroid, i.e. D-nor-5-pregnene-3β-ol-20-one. Degradation of the D-nor-pregnene is effected by the Baeyer-Villiger oxidation using a per-acid such as perbenzoic acid or m-chloroperbenzoic acid. The resulting 16-acetate ester of the intermediary compound of this invention, i.e. D-nor-5-androstene-3β,16β-diol, when subjected to an Oppenauer oxidation of the 3β-OH group, results in the formation of D-nor-testosterone 16-acetate, the 16-acetate ester of which may be hydrolyzed by means of potassium carbonate to give D-nor-testosterone. In this series of reactions, it is necessary to protect the Δ5-bond against oxidation. Proper protection is afforded by halogenation of the bond (preferably with chlorine) followed by dehalogenation with zinc, for example, after the Baeyer-Villiger oxygenation step. In the aforedescribed procedure, by hydrolyzing the ester at C–16 as well as at C–3 prior to the Jones-type oxidation with chromic sulfuric acid reagent, the D-nor-5-androstene-3β,16β-diol is converted to D-nor-4-androstene-3,16-dione.

A sequence of reactions similar to those described above may be utilized to convert an A and B-ring saturated-16β-carboxy-D-nor androstane to D-nor-testosterone. D-nor-androstane-3β-ol-16β - carboxylic acid 3 - acetate is converted to the corresponding 16-acid chloride which upon reaction with dimethyl cadmium yields D-nor-5α-pregnan-3β-ol-20-one 3-actate. Oxidation with perbenzoic acid followed by hydrolysis of the 3,16-diacetate yields D-nor-5α-androstane-3β,16β-diol of this invention which in turn may be oxidized with chromic acid in the presence of pyridine to give D-nor-5α-androstane-3,16-dione. Treatment of the later compound with bromine followed by dehydrobromination with dimethylacetamide utilizing known techniques yields the corresponding 1,4-bis-dehydro analog, i.e. D-nor-1,4 - androstadiene - 3,16-dione, which upon reduction with lithium in ammonia yields D-nor-testosterone.

The D-nor-19-nor-androstanes of this invention may be prepared from the D-nor-1,3,5(10)-estratrienes which, in turn, may be derived from D-nor-androstanes having a methyl group at C-19. For example, D-nor-estrone methyl ether (i.e. D-nor-1,3,5(10)-estratriene-3 - ol - 16-one 3-methyl ether) upon reduction with lithium in ammonia yields D-nor-19-nor-2,5(10)-androstadiene-3,16β-diol 3-methyl ether which, by the action of methanolic hydrochloric acid, is convertible to D-nor-19-nor-testosterone (i.e. D-nor-19-nor-4-androstene-16β-ol-3-one), which in turn, may be oxidized by chromic acid by known methods to (D-nor-19-nor-4-androstene-3,16-dione). Similarly, D-nor-19-nor-2,5(10)-androstadiene-3,16β - diol 3-methyl ether may be oxidized with chromic acid to give the corresponding 16-keto derivative.

D-nor-19-nor-5(10)-androstenes of this invention are also derived from D-nor-1,3,5(10)-estratrienes by treatment of a D-nor-19-nor-2,5(10)-androstadiene (obtained by reduction of D-nor-1,3,5(10)-estratriene as described in the preceding paragraph) with oxalic acid. For example, D-nor-19-nor-2,5(10)-androstadiene-3,16β-diol 3-methyl ether upon reaction with oxalic acid yields D-nor-19-nor-5(10)-androstene-16β-ol-3-one. Similarly, the intermediate D-nor-19-nor-2,5(10)androstadiene-3-ol - 16-one 3-methyl ether (prepared as described in the preceding paragraph (upon reaction with sodium acetylide utilizing known techniques yields 16α-ethinyl-D-nor-19-nor-2,5(10)-androstadiene-3,16β - diol 3 - methyl ether, which upon treatment with oxalic acid yields 16α-ethinyl-D-nor-19-nor-5(10)-androstene-16β-ol - 3 - one which is valuable as an anti-fertility agent. Derivatives of D-norandrostanes and D-nor-19-nor-androstanes prepared as described hereinabove are obtained by using procedures analogous to known methods for the C–17 series. Thus, upon reaction with sodium acetylide, each of D-nor-19-nor-2,5(10)-androstadiene-3-ol-16-one 3-methyl ether, D-nor-19-nor-4-androstene-3,16-dione and D-nor-4-androstene-3,16-dione are convertible to 16α-ethinyl-D-nor-19-nor-2,5(10)-androstadiene - 3,16β - diol 3 - methyl ether, 16α-ethinyl-D-nor-19-nor-4-androstene-16β-ol-3 - one and 16α-ethinyl-D-nor-4-androstene-16β-ol-3-one, respectively. In the case of the latter two compounds, it is preferable to protect the 3-keto function such as by preparing the 3-pyrrolidyl enamine prior to reaction with sodium acetylide. When the 16α-(chloroethinyl) derivative is desired, a 16-keto-D-nor-androstane of my invention is reacted with lithium chloroacetylide (prepared from cis-dichloro-ethylene and methyl lithium by known procedures) whereby the corresponding 16α-(chloroethinyl)-16β-hydroxy-D-nor-steroid is formed. For example, the 3-pyrrolidyl enamine of D-nor-4-androstene-3,16-dione is reacted with lithium chloroacetylide followed by splitting of the enamine by treatment with sodium acetate and acetic acid in methanol-water to yield 16α-(chloroethinyl)-D-nor-testosterone, which is useful as an anti-fertility agent. Similarly, when a 16α-propinyl (i.e. 16α-methylethinyl)-D-nor-androstane is desired, a 16-keto-D-nor-steroid is reacted with sodium methylacetylide, e.g. D-nor-4-androstene-3,16-dione upon reaction with sodium methyl-acetylide yields 16α-propinyl-D-nor-4-androstene-16β-ol-3-one. D-nor-19-nor-4-androstene-3,16-dione and D-nor-4-androstene-3,16-dione after conversion to the respective 3-pyrrolidyl enamine and reaction with a Grignard reagent such as methyl magnesium iodide yields 16α-methyl-D-nor-19-nor-4-androstene-16β-ol-3 - one and 16α-methyl-D-nor-4-androstene - 16β - ol - 3 - one (16α-methyl-D-nor-testosterone), respectively.

Introduction of a $\Delta^1$- double bond into my novel -D-nor-androstanes possessing a 3-keto-$\Delta^4$- system may be effected by known chemical methods such as by means of selenium dioxide or by the use of dichlorodicyanobenzoquinone or, alternatively, by microbiological methods utilizing microorganisms such as *Corynebacterium simplex* (A.T.C.C. 6946). For example, D-nor-testosterone (D-nor-4-androstene-16β-ol-3-one) is subjected to the action of *Corynebacterium simplex* according to procedures described in U.S. Patent No. 2,837,464 for conversion to D-nor-1-dehydrotestosterone (D-nor-1,4 - androstadiene-16β-ol-3one).

In general, unsaturation may be introduced into a saturated A-ring by first converting a 3-hydroxyl group present to a 3-ketone (by oxidation with chromic oxide, for example) followed by dehydrobromination in the usual manner.

The $\Delta^1$-4,5-dihydro-D-nor-androstanes may be obtained from the corresponding 3-keto-D-nor-4-androstenes. For example, D-nor-4-androstene-3,16-dione subjected to the action of hydrogen in the presence of a catalyst such as palladium in a solvent such as ethanol, ethyl acetate or tetrahydrofuran yields D-nor-androstane-3,16-dione. Reaction of the aforementioned D-nor-androstane with one equivalent of a halogen such as bromine yields the respective 2-bromo-analog which is dehydrohalogenated with a reagent such as collidine or dimethylformamide in the presence of calcium carbonate yielding D-nor-1-androstene-3,16-dione.

The 6-dehydro analogs of D-nor-androstenes may be prepared directly from the corresponding 3-keto-D-nor-4-androstene, 3-keto-D-nor - 1,4 - androstadiene - steroids (e.g. D-nor-4-androstene-3,16-dione) by dehydrogenation with an agent such as chloranil in refluxing xylene; or by the allylic halogenation with agents such as N-bromosuccinimide to form the corresponding 6-bromo-intermediate (e.g. 6-bromo-D-nor-4-androstene - 3,16 - dione) and subsequent dehydrohalogenation in refluxing collidine or lutidine to give the corresponding 6-dehydro compounds, e.g. D-nor-4,6-androstadiene-3,16-dione.

It is to be understood that in the specification and in the examples, the conversions shown are by way of illustration only, it being obvious to one skilled in the art that analogous transformations may be carried out when other intermediates are used.

The following additional groups may be introduced into the D-nor-androstanes and analogs thereof of this invention as defined above and without interfering with the process of this invention.

Keto groups such as at C–11;
Hydroxy or acyloxy groups such as C–4, 6, 11, and 15;
Alkyl groups containing up to 4 carbon atoms, and, particularly, methyl, such as at C–2, 4, 6, 7α and 15;
Lower alkylene groups, and, particularly, methylene such as at positions C–6 and C–15;
Halogeno groups, and, particularly, fluorine and chlorine such as at positions 4, 6, 9, 11 and 15 with the proviso that when there is a halogen at C–11, that a halogen is also present at C–9;
Other unsaturations, such as the 9(11)-dehydro bond. When preparing D-nor-steroids of this invention which are substituted at one or more of carbon atoms, 2, 4, 6, 9, 11 and 15, for example, such as is listed above, it is preferable, as described hereinabove, to have all the substituents in the 16β-carboxy-D-nor-steroid starting intermediate prior to building up the C–16 pregnane side chain and the subsequent degradation thereof when preparing androstane and 19-norandrostane intermediates; however, substituents may be introduced in the molecule at any point during the preparation of the D-nor-androstanes by utilizing procedures known in the art.

Thus, to prepare a 6-substituted-16-keto- or 16β-hydroxy-D-nor-androstane of this invention one preferentially starts with a 6α-methyl-16β-carboxylic-D-nor-androstane intermediate such as 6α-methyl-D-nor-4-androstene-3,11-dione-16β-carboxylic acid prepared from 6α-methyl-4-androstene-3,11,17-trione by methods analogous to those described in my U.S. Patent No. 3,113,142.

By utilizing procedures such as described hereinabove and in the examples and similar to those known in the art, there is obtained a 6α-methyl-16-keto- or 16β-hydroxy-D-nor-androstane of this invention.

Alternatively, a 6-substituent is introduced into a 16-keto- or 16β-hydroxy-D-nor-androstane of my invention to form a corresponding 6-substituted D-nor-androstane by employing known chemical techniques. For example, a D-nor-androstane such as D-nor-testosterone (D-nor-4-androstene-16β-ol-3-one) is treated with ethylene glycol by known procedures to form the 3-ethylene ketal derivative which, in turn, is epoxidized on treatment with a peracid such as peracetic or preferably monoperphthalic acid to give the epoxy derivative, 5α,6α-epoxy - D - nor-androstane-16β-ol-3-one 3-ethylene ketal. From this epoxy intermediate both the 6-methyl and 6-halogeno substituents (e.g. 6-fluoro, 6-chloro, and 6-bromo) may be introduced into the D-nor-androstane nucleus. Thus, the action of a hydrohalic acid, e.g. hydrofluoric acid, on the epoxy ethylene ketal intermediate simultaneously hydrolyzes the ethylene ketal group and opens the epoxy ring yielding the corresponding 5α-hydroxy-6β-halogeno intermediate, e.g. 5α-hydroxy-6β-fluoro-D-nor-androstane-16β-ol-3-one; whereas addition of a Grignard reagent such as methyl magnesium iodide with subsequent hydrolysis yields the 5α-hydroxy-6β-methyl compound, e.g. 6β-methyl-D-nor-androstane-5α,16β-diol-3-one. A reagent such as ethanolic hydrochloric acid on the 5α-hydroxy-6β-substituted intermediate simultaneously dehydrates the 5α-hydroxy group and epimerizes the 6β-substituent to yield, respectively, 6α-fluoro-D-nor-4-androstene-16β-ol-3-one and 6α-methyl-D-nor-4-androstene-16β-ol-3-one. On the other hand, when 5α-hydroxy-6β-substituted D-nor-androstane intermediates are treated with, for example, approximately 90% acetic acid or with thionyl chloride in a cold basic medium such as pyridine there are obtained 6β-substituted D-nor-androstanes such as 6β-fluoro-D-nor-4-androstene-16β-ol-3-one and 6β-methyl-D-nor-4-androstene-16β-ol-3-one. The 6α-substituted D-nor-androstane may also be prepared from the corresponding 6β-substituted isomers by means of alcoholic solutions of acids or bases such as ethanolic hydrogen chloride and ethanolic potassium hydroxide.

An 11-hydroxyl function may be introduced into the molecule via conventional methods; the microbiological techniques are convenient, the microorganism *Curvularia lunata* (N.R.L.L. 2380) being used to introduce an 11β-hydroxyl group and *Glomerella cingulata* (A.T.C.C. Nos. 10,529–10,534) for the introduction of an 11α-hydroxyl group.

Introduction of a 9(11)-double bond and the subsequent introduction of 9,11-halohydrins and 9α,11β-dihalogeno derivatives into my novel D-nor-steroids is also effected by methods analogous to those used in the C–17 cyclopentanoid-D-ring steroidal art.

The D-nor-9(11)-dehydro androstanes are thus valuable as intermediates in preparing the corresponding 9,11-halohydrins and 9,11-dihalogeno derivatives via known techniques.

The 9(11)-dehydro-D-nor-androstanes are also valuable as intermediates in preparing the corresponding 9α,11β-dihalogeno-D-nor-androstanes by utilizing techniques on my D-nor-9(11)-dehydro-steroids similar to those described in U.S. Patent Nos. 2,894,963, and 3,009,928–3,009,933.

Some further typical examples whereby D-nor-androstanes of this invention are converted to D-nor-steroidal derivatives which are either therapeutically active per se or are valuable as intermediates are disclosed hereinbelow.

Steroidal D-nor-16-spirolactones, which are useful anti-aldosterone and diuretic agents, are prepared essentially according to procedures described in the literature for C-17-steroids. 16α-ethinyl-D-nor-testosterone is converted to the 3-ethylene ketal-$\Delta^5$-derivative in the usual manner and the latter is converted to the acetylenic Grignard reagent by exchange with methylmagnesium bromide. Carbonation (treatment with carbon dioxide) of the steroidal Grignard compound gives rise to 3-ethylenedioxy-16β-hydroxy-D-nor-5-androstene-16α-yl-propynoic acid. Selective hydrogenation of the triple bond with one equivalent of hydrogen, followed by treatment of the crude product with mineral acid gives 3-(3-keto-16β-hydroxy-D-nor-4-androstene-16α-yl)-propenoic acid lactone. Selective hydrogenation of the side-chain double bond with one equivalent of hydrogen gives 3-(3-keto-16β-hydroxy-D-nor-4-androsten-16α-yl) propionic acid lactone. The latter compound may be dehydrogenated to the 6-dehydro analog by the use of chloranil and subsequently thioacetic acid may be added to the 3-keto-4-, 6-diene system to give 3-(7α-thioacetoxy-3-keto-16β-hydroxy-D-nor-4 - androstene-16α-yl) propionic acid lacetone.

Useful D-nor-3-keto-4,9(10)-diene steroids may be prepared by procedures similar to those known in the C–17 steroidal art. Thus, 16α-ethinyl-D-nor-19-nor - 5(10)-androstene-16β-ol-3-one on treatment with pyridinium bromide hydrobromide in pyridine gives 16α-ethinyl-D-nor-19-nor-4,9(10)-androstadiene-16β-ol-3 - one. Similarly, 16α-chloroethinyl-D-nor-19-nor-5(10)-androstene - 16β-ol-3-one (prepared from 3-methyoxy-D-nor-19-nor - 2, 5(10)-androstadiene-17-one by treatment with lithium chloroacetylide followed by hydrolysis with oxalic acid) on bromination in pyridine gives 16α-chloroethinyl-D-nor-19-nor-4,9(10)-androstadiene-16β-ol-3 - one. These compounds are highly active anti-fertility agents.

D-nor-analogs of known anabolic agents may be readily obtained from my novel D-nor-steroids. Thus, treatment of D-nor-testosterone acetate with alkaline hydrogen peroxide, followed by reacetylation, gives the corresponding 4,5-epoxide. The latter on treatment with hydrogen chloride in acetic acid gives 4-chloro-D-nor-testosterone acetate. Similarly, 19-nor-D-nor-testosterone acetate and 16α-methly-D-nor-testosterone are converted to their 4-chloro analogs, 4-chloro-19-nor-D-nor-testosterone acetate and 4-chloro-16α-methyl-D-nor - testosterone. In a similar manner, but using a small amount of sulfuric acid in acetic acid instead of hydrogen chloride, the corresponding 4-hydroxy compounds, 4-hydroxy-D-nor-testosterone acetate, 4-hydroxy-19-nor-D-nor-testosterone acetate and 4-hydroxy-16α-methyl-D-nor-testosterone are obtained.

Dihydro-D-nor-testosterone analogs are prepared as follows: D-nor-5α-pregnane-3β-ol-20-one is oxidized with m-chloroperbenzoic acid to give D-nor-androstane-3β,16β-diol 16-acetate. The latter compound is oxidized with chromic acid, yielding the 3-keto compound, D-nor-dihydrotestosterone acetate. Condensation with ethylformate and base gives 2-hydroxymethylene-D-nor-dihydrostestosterone which on hydrogenation over palladium on carbon catalyst yields 2α-methyl-D-nor-dihydrotestosterone.

The 6-methylene derivatives of my novel D-nor-steroids are prepared from 6-methyl-D-nor-4-androsten-3 - ones. Thus a D-nor-6-methyl-3-keto-4-dehydro steroid is converted to its 3-alkyl enol ether for example with an alkyl orthoformate and the corresponding alcohol in the presence of an acid catalyst and the latter allowed to react with active manganese dioxide, freshly prepared according to the procedure of United States Patent 2,980,711, resulting in the formation of the desired D-nor-6-methylene-3-keto-4-dehydro steroid. The latter may be converted to the corresponding 1-dehydro analog in the usual manner, for example, by treatment with dichlorodicyanobenzoquinone.

The esters of my D-nor-steroids are prepared according to conventional techniques. Thus, lower alkanoyl esters are prepared by reacting the corresponding hydroxy compound with pyridine and an acid anhydride. For example, D-nor-testosterone, D-nor - estrone and D - nor-prednisolone, upon reaction with acetic anhydride in pyridine yields the corresponding acetate ester, i.e. D-nor-testosterone 16-acetate, D-nor-estrone 3-acetate and D-nor-prednisolone 21-acetate, respectively. By substituting other lower alkanoic acid anhydrides such as propionic anhydride, in addition to being useful for protecting hydroxyl groups in processes such as are described herein, the esters of my D-nor-steroids are useful in that the therapeutic activities thereof are generally of longer duration than the corresponding hydroxy-D-nor-steroid.

The following are examples which illustrate my invention. It is to be understood that the invention is not to be limited to the exact details of operation or exact compounds shown and described as obvious modifications and equivalents will be apparent to one skilled in the art; the invention is therefore to be limited only by the scope of the appended claims.

EXAMPLE 1

*D-nor-androstane-3β,16β-diol and the diacetate thereof*

A. D-NOR-ANDROSTANE-3β-OL-16β-CARBOXYLIC ACID 3-ACETATE

To 400 mg. of D-nor-androstane-3β-ol-16β-carboxylic acid in 5 ml. of pyridine add 0.5 ml. of acetic anhydride and allow the solution to stand overnight at room temperature. Dilute the reaction mixture with ether and extract the ethereal solution with 0.1 N aqueous sodium hydroxide. Neutralize with cold hydrochloric acid, filter the resultant precipitate, wash with water, and recrystallize from acetone-water. Collect the precipitate, D-nor-androstane-3β-ol-16β-carboxylic acid 3-acetate, on a filter and dry.

B. D-NOR-ANDROSTANE-3β-OL-16β-CARBOXYLIC ACID CHLORIDE 3-ACETATE

Reflux for 1 hour a mixture of 2.63 g. of D-nor-androstane-3β-ol-16β-carboxylic acid 3-acetate and 2.5 g. of oxalyl chloride in 20 ml. of dry benzene then distill in vacuo the excess oxalyl chloride and benzene. The residue substantially of D-nor-androstane-3β-ol-16β-carboxylic acid chloride 3-acetate is used without further purification in the reaction immediately following.

C. D-NOR-5α-PREGNANE - 3β - OL - 20 - ONE 3-ACETATE (16β-ACETYL-D-NOR-ANDROSTANE-3β-OL 3-ACETATE)

Prepare two equivalents of dimethyl cadmium in benzene according to the procedure in F. A. Shirely, "Organic Reactions," vol. VIII, John Wiley & Sons, Inc., New York, N.Y. (1954). Add this benzene solution of dimethyl cadmium slowly and dropwise to a well stirred solution of the acid chloride prepared in Example 2B in 50 ml. of dry benzene. Stir the resultant mixture for 1 hour and then reflux for 15 minutes.

Acidify the reaction mixture then extract with ether. Combine the ethereal extracts, with 3 N hydrochloric acid, water, then with sodium bicarbonate solution, and dry over magnesium sulfate. Evaporate the ether and chromatograph the resultant residue over Woelm neutral alumina, activity grade III, eluting with 7:3 hexane-benzene. Combine the eluates and evaporate to a residue of D-nor-5α-pregnane-3β-ol-20-one 3-acetate. Purify by recrystallization from hexane.

D. D-NOR-ANDROSTANE-3β,16β-DIOL DIACETATE

Prepare a solution of 280 mg. of D-nor-5α-pregnane-3β-ol-20-one 3-acetate and 112 mg. of perbenzoic acid in 2 ml. of chloroform and allow the solution to stand in the dark for 8 days at room temperature. Dilute the reaction mixture with ether and wash the organic solution with sodium carbonate and water. Dry the solution over magnesium sulfate, filter, and evaporate, chromatograph the resultant residue over Woelm neutral alumina, activity grade III, in hexane and elute with 1:1 hexane-benzene. Combine the eluates and distill the hexane-benzene in vacuo to a residue substantially of D-nor-androstane-3β,16β-diol diacetate. Purify by subliming the residue and recrystallizing the sublimate product from aqueous ethanol.

E. D-NOR-ANDROSTANE-3β,16β-DIOL

Reflux for 2 hours a mixture of 200 mg. of D-nor-androstane-3β,16β-diol diacetate and 200 mg. of potassium carbonate in 40 ml. of 3:1 methanol-water. Dilute the reaction mixture with water and filter to give a residue of D-nor-androstane-3β,16β-diol. Purify the residue by chromatography of Woelm neutral alumina, activity grade III, in ether eluting with 6% acetone in ether followed by recrystallization with aqueous methanol.

Alternatively, the compounds of this example may be prepared as follows:

Prepare a trifluoroperacetic aid solution by adding 2.75 ml. of trifluoroacetic anhydride to 0.42 ml. of 90% hydrogen peroxide in 15 ml. of methylene chloride. Add 10 ml. of this trifluoroperacetic acid solution to a mixture of 1.2 g. of D-nor-5α-pregnane-3β-ol-20-one 3-acetate and 3.2 g. of disodium hydrogenphosphate in 25 ml. of methylene chloride. Reflux the mixture overnight then add 3.2 g. more of disodium hydrogenphosphate and the remaining trifluoroperacetic acid solution. Reflux the mixture for an additional 6 hours, then cool, wash the reaction mixture three times with water and dry the methylene chloride solution over magnesium sulfate, filter, and evaporate to a residue substantially of D-nor-androstane-3β,16β-diol diacetate, which is used without further purification in the procedure immediately following.

Into ice cold ether place 1.1 g. of the diacetate product prepared above and a molar excess of lithium aluminum hydride. Stir the reaction mixture for 2.5 hours, then decompose the excess hydride by the addition of water, then filter the salts from the ether solution. Wash the ether solution with 3 N hydrochloric acid, then water, and finally sodium bicarbonate solution, dry the solution over magnesium sulfate, filter and evaporate to a residue of D-nor-androstane-3β,16β-diol.

EXAMPLE 2

*D-nor-androstane-3,16-dione*

To an ice cold solution of 0.36 g. of D-nor-androstane-3β,16β-diol in 10 ml. of pyridine add 0.45 g. of chromium trioxide in 5 ml. of ice cold pyridine. Allow the reaction mixture to warm up to room temperature and stir for 36 hours. Add water and extract the reaction mixture with ether. Wash the ethereal solution with 3 N hydrochloric acid, water and sodium bicarbonate solution. Dry the ether solution over magnesium sulfate and evaporate to a residue substantially of D-nor-androstane-3,16-dione. Purify by chromatographing over Woelm neutral alumina, activity grade III, eluting with 1:1 hexane-benzene. Combine the eluates and evaporate to a residue, recrystallize the residue from ether.

EXAMPLE 3

*D-nor-1,4-androstadiene-3,16-dione*

A. 2,4-DIBROMO-D-NOR-ANDROSTANE-3,16-DIONE

To a solution of 1 g. of D-nor-androstane-3,16-dione in 10 ml. of acetic acid at room temperature add 0.2 ml. of 4 N hydrogen bromide in acetic acid followed by 18.3 ml. of a solution of 1.6 g. of bromine in 25 ml. of acetic acid. After disappearance of the bromine color, warm the solution to 50° C. and allow it to stand at room temperature for 4 hours. Carefully dilute the solution with water and filter the resultant precipitate, wash well with water, and dry, to give 2,4-dibromo-D-nor-androstane-3,16-dione. Purify by crystallization from acetone-hexane.

B. D-NOR-1,4-ANDROSTADIENE-3,16-DIONE

Heat to reflux temperature a suspension of 1 g. of anhydrous calcium carbonate in 10 ml. of dimethylacetamide. Then add 1 g. of 2,4-dibromo-D-nor-androstane-3,16-dione and reflux the mixture for 15 minutes. Cool and pour the reaction mixture into cold 1 N hydrochloric acid. Filter the resultant precipitate, wash with water, and dry to give D - nor - 1,4 - androstadiene - 3,16 - dione. Purify by recrystallization from acetone-hexane.

EXAMPLE 4

*D-nor-19-nor-5(10)androstene-16β-ol-3-one*
*(D-nor-5(10)-estrene-16β-ol-3-one)*

A. D-NOR-ESTRONE

Pass a suspension of 5 g. of D-nor-1,4-androstadiene-3,16-dione in 250 ml. of mineral oil through a Vycor glass column filled with Pyrex glass helices heated to about 550° C. at a rate of 10 ml./min. in a nitrogen atmosphere. Collect the effluent in an ice-cooled receiver, dilute with hexane and extract with 5% aqueous sodium hydroxide. Acidify the extracts with diluted hydrochloric acid and filter the resultant precipitate, wash with water, and dry to give D-nor-estrone. Purify by crystallizing from ethyl acetate after treating the ethyl acetate solution with decolorizing charcoal.

B. D-NOR-ESTRONE METHYL ETHER (D-NOR-1,3,5(10)-ESTRATRIENE-3-OL-17-ONE 3-METHYL ETHER)

Add 3 ml. of dimethyl sulfate to a stirred solution of 3 g. of D-nor-estrone and 18 g. of potassium hydroxide in a mixture of 150 ml. of methanol and 30 ml. of water. At 30 minute intervals, add three additional 3 ml. portions of dimethyl sulfate, then stir the solution an additional hour. Remove most of the solvent in vacuo then add water and filter the resultant precipitate. The precipitate is washed well with water and dried to give D-nor-estrone methyl ether. Purify by crystallization from aqueous methanol.

C. D-NOR-2,5(10)-ESTRADIENE-3,16β-DIOL-3-METHYL ETHER

To a stirred solution of 1 g. of D-nor-estrone methyl ether (the compound of Example 6B) in 100 ml. of ether and 100 ml. of liquid ammonia at about −60° C. add 1 g. of lithium metal in small pieces. To the resulting blue solution add dropwise 32 ml. of ethanol over a period of about 50 minutes. Allow the decolorized solution to evaporate, add water to the residue and extract with ether. Combine the ether extracts, wash with water, dry over magnesium sulfate, and concentrate to a residue of D - nor - 2,5(10) - estradiene - 3,16β - diol - 3 - methyl ether. Purify by crystallization from acetone-hexane.

D. D-NOR-5(10)-ESTRENE-16β-OL-3-ONE

Keep at room temperature for 40 minutes a solution of 200 mg. of D-nor-2,5(10)-estradiene-3,16β-diol 3-methyl ether in 16 ml. of methanol and 3 ml. of water containing 250 mg. of oxalic acid. Pour the reaction mixture into ice water, filter the resulting precipitate, wash with water, and dry to give D-nor-5(10)-estrene-3-one-16β-ol. Purify by crystallization from ether-hexane.

EXAMPLE 5

*D-nor-19-nor-testosterone (D-nor-4-estrene-16β-ol-3-one)*

Heat under reflux for 20 minutes a solution of 200 mg. of D - nor - 2,5(10) - estradiene - 3,16β - diol 3 - methyl ether (the compound of Example 4C) in 50 ml. of 90% aqueous methanol containing 0.5 ml. of concentrated hydrochloric acid. Cool the reaction mixture and concentrate in vacuo. Add cold water to the residue, filter the resulting precipitate, wash with water, and dry to give D-nor-19-nor-testosterone. Purify by crystallization from acetone-hexane.

EXAMPLE 6

*D-nor-19-nor-4-androstene-3,16-dione (D-nor-4-estrene-3,16-dione)*

To a solution of 50 ml. of D-nor-19-nor-testosterone in 5 ml. of acetone, cooled to 5° C., add dropwise chromic acid-sulfuric acid reagent (266 mg. $CrO_3$/ml.) until a permanent orange color is obtained. Keep the solution at room temperature for 5 minutes then add a little methanol to destroy any excess reagent. Pour the solution into ice water and extract with ether. Combine the ether extracts, wash and dry over magnesium sulfate and evaporate in vacuo to a residue of D-nor-19-nor-4-androstene - 3,16 - dione (D - nor - 4 - estrene - 3,16 - dione). Purify by crystallization from acetone-hexane.

EXAMPLE 7

*16α-methyl-D-nor-19-nor-testosterone (16α-methyl-D-nor-4-estrene-16β-ol-3-one)*

A. D-NOR-4-ESTRENE-3,16-DIONE 3-PYRROLIDYL ENAMINE

Heat to boiling a solution of 1 g. of D-nor-4-estrene-3,16-dione in 10 ml. of methanol then add 0.75 ml. of pyrrolidine. Boil the mixture for 10 minutes then cool. Filter the resulting precipitate and wash with cold methanol and dry to give the D-nor-4-estrene-3,16-dione 3-pyrrolidyl enamine which is used without further purification in the procedure immediately following.

B. 16α-METHYL-D-NOR-19-NOR-TESTOSTERONE

To 1.5 g. of magnesium turnings in 50 ml. of dry ether add dropwise under anhydrous conditions, 5.0 ml. of iodomethane at a rate sufficient to maintain slight reflux. Add 50 ml. of purified tetrahydrofuran and distill until the mixture temperature is 60° C. Add 50 ml. of ether followed by the dropwise addition of a solution of 1.4 g. of D-nor-4-estrene-3,16-dione 3-pyrrolidyl enamine in 50 ml. of tetrahydrofuran. Distill this mixture to a boiling temperature of 60° C. then keep at reflux for 3 hours then stir at room temperature overnight. Cool in an ice bath and then add dropwise 28 ml. of water followed by a solution of 8 ml. of acetic acid in 50 ml. of methanol. Boil this mixture for 30 minutes then cool and add 28 ml. of 10% aqueous sodium hydroxide. Heat this mixture for 30 minutes, cool to room temperature, acidify with acetic acid and concentrate in vacuo to a volume of about 75 ml. To this residue add a mixture of 5 ml. of concentrated hydrochloric acid and 5 g. of ice. Extract the reaction solution with methylene chloride then combine the extracts and wash with water, dilute sodium hydroxide, then water, dry over magnesium sulfate, and concentrate to a residue substantially of 16α-methyl-D-nor-19 - nor - testosterone. Purify by chromatographing on Florisil eluting with ether-hexane mixtures.

In a similar manner, other 16α-lower alkyl-D-nor-19-nor-testosterones may be prepared, for example, if ethyl bromide is used in the above procedure instead of methyl iodide, there will be obtained 16α-ethyl-D-nor-19-nor-testosterone.

EXAMPLE 8

*16α-ethinyl-D-nor-19-nor-testosterone*

To a solution of 500 mg. of D-nor-4-estrene-3,16-dione 3-pyrrolidyl enamine (compound of Example 7A) in 10 ml. of dimethylsulfoxide add a suspension, in 3 ml. of dimethylsulfoxide, of sodium acetylide obtained by centrifugation of 1.5 ml. of 18% sodium acetylide in xylene. Stir the mixture at 20° C. for 15 minutes then pour into ice water and acidify with dilute hydrochloric acid. Filter the resulting precipitate, wash with water, and dry to give 16α - ethinyl-D-nor-19-nor-testosterone 3 - enamine. Purify by crystallization from acetone-hexane.

Place the enamine prepared above in a mixture of 1.6 g. of sodium acetate, 2 ml. of water, 1 ml. acetic acid and 20 ml. of methanol. Reflux for 3 hours then remove the solvent in vacuo and dissolve the resultant residue in methylene chloride. Wash the organic solution with water, dilute hydrochloric acid, dilute sodium bicarbonate, and water, then dry over magnesium sulfate and concentrate in vacuo to a residue substantially of 16α-ethinyl-D-nor-19-nor-testosterone. Purify by chromatographing on Florisil eluting with mixtures of ether-hexane.

EXAMPLE 9

*16α-ethinyl-D-nor-19-nor-5(10)-androstene-16β-ol-3-one*

A. D-NOR-2,5(10)-ESTRADIENE-3-OL-16-ONE 3-METHYL ETHER

To a solution of 1.5 g. of D-nor-2,5(10)-estradiene-3,16β-diol-3-methyl ether (the compound of Example 4C) in 15 ml. of pyridine add a reagent prepared by the addition of 1.5 g. of chromium trioxide to 15 ml. of pyridine. Keep the mixture at room temperature overnight then pour into ice water. Filter the resultant precipitate, wash well with water and dry, to give substantially D-nor-2,5(10)-estradiene-3-ol-16-one 3-methyl ether. Purify by crystallization from isopropyl ether.

B. 16α-ETHINYL-D-NOR-2,5(10)-ESTRADIENE-3,16β-DIOL 3-METHYL ETHER

Treat a solution of 300 mg. of D-nor-2,5(10)-estradiene13l0l-16-one 3-methyl ether in 6 ml. of dimethyl sulfoxide with sodium acetylide according to the procedure of Example 8, with the exception that the aqueous suspension obtained by pouring the reaction mixture into water is not acidified. The precipitate formed after the reaction mixture is poured into ice water is filtered, washed with water, and dried giving substantially 16α-ethinyl-D-nor-2,5(10)-estradiene-3,16β-diol 3-methyl ether. Purify by crystallization from ether.

C. 16α-ETHINYL-D-NOR - 19 - NOR-5(10)-ANDROSTENE-16β - OL-3-ONE (16α-ETHINYL-D-NOR-5(10)-ESTRENE-16β-OL-3-ONE)

Allow to react according to the procedure of Example 4D a solution of 150 mg. of 16α-ethinyl-D-nor-2,5(10)-estradiene-3,16β-diol 3-methyl ether with oxalic acid. Purify the resultant product of 16α-ethinyl-D-nor-19-nor-5(10)-androstene-16β-ol-3-one by crystallization from isopropyl ether.

EXAMPLE 10

*16α-ethinyl-D-nor-1,4-androstadiene-16β-ol-3-one*

According to the procedure of Example 8, allow sodium acetylide to react with a solution of 500 mg. of D-nor-1,4-androstadiene-3,16-dione (the compound of Example 3) in 10 ml. of dimethyl sulfoxide. After pouring the reaction mixture into ice water and acidifying with hydrochloric acid, stir at room temperature for 1 hour then filter the resultant precipitate, wash with water, and dry yielding substantially 16α-ethinyl-D-nor-1,4-androstadiene-16β-ol-3-one. Purify by crystallization from acetone-hexane.

EXAMPLE 11

*D-nor-testosterone (D-nor-4-androstene-16β-ol-3-one)*

To a stirred solution of 1 g. of lithium metal in 200 ml. of liquid ammonia at −60 to −70° C. add in one portion a solution of 2 g. D-nor-1,4-androstadiene-3,16-dione in 100 ml. of purified tetrahydrofuran. Stir the mixture under anhydrous conditions for 1 minute, then add solid ammonium chloride with vigorous stirring until the blue color is discharged. Allow the ammonia to evaporate then add water to the residue. Filter the resulting solid, wash well with water, then dissolve in acetone and treat with decolorizing charcoal. Induce crystallization by the addition of hexane and concentration of the solution. The resultant precipitate is filtered and dried giving substantially D-nor-testosterone. Purify by recrystallization from isopropyl ether.

EXAMPLE 12

*D-nor-testosterone propionate (D-nor-4-androstene-16β-ol-3-one propionate)*

Add 0.5 ml. of propionic anhydride to a solution of 500 mg. of D-nor-testosterone in 5 ml. of pyridine. Keep the mixture at room temperature for 24 hours then pour into ice water and stir for 30 minutes. Filter the resulting precipitate of D-nor-testosterone propionate and purify by crystallization from acetone-hexane.

EXAMPLE 13

*D-nor-4-androstene-3,16-dione*

To a solution of 50 ml. of D-nor-4-androstene-16β-ol-3-one in 5 ml. of acetone, cooled to 5° C., add dropwise chromic acid-sulfuric acid reagent (266 mg. $CrO_3$/ml.) until a permanent orange color is obtained. Keep the solution at room temperature for 5 minutes then add a little methanol to destroy any excess reagent. Pour the solution into ice water and extract with ether. Combine the ether extracts, wash and dry over magnesium sulfate and evaporate in vacuo to a residue of D-nor-4-androstene-3,16-dione. Purify by crystallization from acetone-hexane.

EXAMPLE 14

*16α-methyl-D-nor-4-androstene-16β-ol-3-one*

A. D-NOR-4-ANDROSTENE-3,16-DIONE 3-PYRROLIDYL ENAMINE

Convert D-nor-4-androstene-3,16-dione to the corresponding 3-pyrrolidyl enamine by treatment with pyrrolidine in methanol according to the procedure of Example 7A. Filter the resultant product, wash with methanol and dry to give D-nor-4-androstene-3,16-dione 3-pyrrolidyl enamine which is used without further purification in the next procedure.

B. 16α-METHYL-D-NOR-4-ANDROSTENE-16β-OL-3-ONE

According to the procedure of Example 7B allow a solution of methyl magnesium iodide in ether-tetrahydrofuran to react with a solution of 1 g. of D-nor-4-androstene-3,16-dione 3-pyrrolidyl enamine in tetrahydrofuran. Isolate the product in the manner described in Example 7B giving 16α-methyl-D-nor-4-androstene-16β-ol-3-one.

In a similar manner, by substituting ethyl magnesium bromide for methyl magnesium iodide in the above procedure there is obtained 16α-ethyl-D-nor-4-androstene-16β-ol-3-one.

EXAMPLE 15

*D-nor-ethisterone (15α-ethinyl-D-nor-4-androstene-16β-ol-3-one)*

According to the procedure of Example 8, allow sodium acetylide to react with a solution of 250 mg. of D-nor-4-androstene-3,16-dione 3-enamine (the compound of Example 14A) in 5 ml. of dimethylsulfoxide. Isolate the resultant product according to the procedure described in Example 8. Purify by crystallization from acetone-hexane to give D-nor-ethisterone.

EXAMPLE 16

*D-nor-5-pregnene-3β-ol-20-one*

A. D-NOR-5-ANDROSTENE-3β-OL-16β-CARBOXYLIC ACID CHLORIDE 3-ACETATE

To 3 g. of D-nor-5-androstene-3β-ol-16β-carboxylic acid 3-acetate in 25 ml. of anhydrous benzene add 2.5 ml. of oxalyl chloride and heat the mixture under reflux for one hour. Distill the benzene in vacuo under anhydrous conditions. The resultant residue of substantially D-nor-5-androstene-3β-ol-16β-carboxylic acid chloride 3-acetate is used without further purification in the procedure immediately following.

B. 21-DIAZO-D-NOR-5-PREGNENE-3β-OL-20-ONE 3-ACETATE

To a solution of 1 g. of D-nor-5-androstene-3β-ol-16β-carboxylic acid chloride 3-acetate in 25 ml. of benzene add a solution of diazomethane in ether until a persistent yellow color is obtained. Allow the mixture to stand at room temperature for 30 minutes then concentrate under reduced pressure to a residue of 21-diazo-D-nor-5-pregnene-3β-ol-20-one 3-acetate. Purify by crystallization from ether-hexane.

C. D-NOR-5-PREGNENE-3β-OL-20-ONE 3-ACETATE

To a solution of 500 mg. of 21-diazo-D-nor-5-pregnene-3β-ol-20-one 3-acetate in 50 ml. of ether add a solution of about 500 mg. of hydrogen bromide in 15 ml. of ether. Stir the mixture at room temperature for 30 minutes then wash the solution with cold water, cold sodium bicarbonate solution and again with water, then dry over magnesium sulfate and concentrate under reduced pressure. To the resultant residue containing 21-bromo-D-nor-5-pregnene-3β-ol-20-one 3-acetate add 15 ml. of acetone and a solution of 1.5 g. of sodium iodide in 15 ml. of acetone. Heat the mixture at reflux temperature for one hour then add 1 ml. of acetic acid and heat the mixture under reflux for an additional 30 minutes. Decolorize the resulting brown solution by the addition of aqueous sodium bisulfite then pour the mixture into ice water. Filter the resulting precipitate, wash with water and dry to give D-nor-5-pregnene-3β-ol-20-one 3-acetate. Purify by crystallization from hexane.

Alternatively, the compound of this example is prepared by reacting D-nor-5-androstene-3β-ol-16β-carboxylic acid chloride 3-acetate (the compound of Example 16A) with dimethyl cadmium reagent in the manner described in Example 1C.

D. D-NOR-5-PREGNENE-3β-OL-20-ONE

Dissolve 300 mg. of D-nor-5-pregnene-3β-ol-20-one 3-acetate in a mixture of 10 ml. of acetone and 20 ml. of 5% hydrochloric acid in 90% aqueous methanol. Allow the solution to stand at room temperature for 24 hours then remove about half the solvent under reduced pressure. Pour the residual solution into ice water, filter the resultant precipitate of D-nor-5-pregnene-3β-ol. Purify by crystallization from acetone-hexane.

EXAMPLE 17

*D-nor-4-androstene-16β-ol-3-one (D-nor-testosterone) and the acetate ester thereof*

A. 5,6-DICHLORO-D-NOR-PREGNENE-3β-OL-20-ONE

To a solution of 1 g. of D-nor-5-pregnene-3β-ol-20-one in a mixture of 25 ml. of carbon tetrachloride and 5 ml. of methylene chloride containing 0.75 ml. of pyridine add at —20° C. a solution of 240 mg. of chlorine in 2.7 ml. of carbon tetrachloride. Stir the mixture at —20° C. for 30 minutes then allow to warm to room temperature over a period of 30 minutes. Dilute the reaction mixture with methylene chloride and wash the organic solution with water, sodium thiosulfate solution, and again with water. Dry the methylene chloride solution with magnesium sulfate then concentrate to a residue of substantially 5,6 - dichloro - D - nor-pregnane-3β-ol-20-one. Purify by crystallization from methylene chloride-pentane.

B. 5,6-DICHLORO-D-NOR-ANDROSTANE-3β,16β-DIOL 16-ACETATE

To a solution of 300 mg. of 5,6-dichloro-D-nor-pregnane-3β-ol-20-one in 5 ml. of chloroform add 140 mg. of m-chloroperbenzoic acid. Allow the mixture to stand at room temperature for 72 hours then dilute with methylene chloride and wash with sodium bisulfite solution, sodium bicarbonate solution, and water. Dry the organic solution over magnesium sulfate then concentrate the solution to a residue of substantially 5,6-dichloro-D-nor-androstane-3β,16β-diol 16-acetate. Purify by crystallization with ether.

C. D-NOR-5-ANDROSTENE-3β,16β-DIOL 16-ACETATE

To a solution of 200 mg. of 5,6-dichloro-D-nor-androstane-3β,16β-diol 16-acetate in 5 ml. of acetone add a solution of 500 mg. of sodium iodide in 5 ml. of acetone. Stir the mixture at room temperature for 5 hours then add a solution of sodium bisulfite util the brown solution is decolorized. Pour the reacation mixture into ice water, filter the resulting precipitate of substantially D-nor-5-androstene-3β,16β-diol 16-acetate, wash with water and dry. Puirfy by crystallization from acetone-hexane.

D. D-NOR-4-ANDROSTENE-16β-OL-3-ONE 16-ACETATE

In the manner described in the alternative procedure of Example 6, oxidize D-nor-5-androstene-3β,16β-diol 16-acetate with chromic acid-sulfuric acid reagent followed by treatment with dilute hydrochloric acid. Isolate the resultant product of substantially D-nor-4-androstene-16β-ol-3-one 16-acetate in the described manner and purify by crystallization from acetone-hexane.

D. D-NOR-4-ANDROSTENE-16β-OL-3-ONE (D-NOR-TESTOSTERONE)

Hydrolyze D-nor-4-androstene-16β-ol-3-one 16-acetate with potassium carbonate in methanol-water in the manner described in Example 1E. The resultant product of D-nor-4-androstene-16β-ol-3-one is isolated and purified in the described manner.

EXAMPLE 18

*D-nor-1,4-androstadiene-16β-ol-3-one*

Subject D-nor-4-androstene-16β-ol-3-one to the action of a culture of *Corynebacterium simplex* in the following manner:

A solution of 1 g. of yeast extract (Difco) in one liter of tap water, the pH of which is adjusted to 6.9, is distributed among ten 300 ml. Erlenmeyer flasks and to each flask is added a loopful, 2 ml., of *Corynebacterium simplex*. The resulting suspensions are incubated at 30° C. on a shaking machine for 18 hours. One-half gram of D-nor-4-androstene-16β-ol-3-one is dissolved in 25 ml. of acetone and the resulting solution is distributed equally among the ten flasks containing the 18-hour growth of *C. simplex*. The culture containing the D-nor-4-pregnene-3,20-dione is then incubated at 30° C. for 24 hours. At the end of 24 hours, the contents of the flasks are combined and extracted with a total of 3 liters of chloroform. The crude chloroform extract from the transformation is then concentrated to a residue which is crystallized from methylene chloride-hexane, affording D-nor-1,4-androstadiene-16β-ol-3-one.

EXAMPLE 19

*D-nor-androstane-3α-ol-16-one (D-nor-androsterone)*

A. D-NOR-5α-PREGNANE-3α-OL-20-ONE

React D-nor-androstane-3α-ol-16β-carboxylic acid 3-acetate with oxalyl chloride according to the method of Example 1B to give D-nor-androstane - 3α - ol - 16β - carboxylic acid chloride. Treat D-nor-androstane-3α-ol-16β-carboxylic acid chloride with dimethyl cadmium in the manner described in Example 1C, then hydrolyze the resulting D-nor-5α-pregnane-3α-ol-20-one 3-acetate with potassium carbonate in methanol-water according to the procedure of Example 1E giving D-nor-5α-pregnane-3α-ol-20-one.

B. 3α-TETRAHYDROPYRANYLOXY-D-NOR-5α-PREGNANE-20-ONE

To a solution of 2.0 g. of D-nor-5α-pregnane-3α-ol-20-one in 20 ml. of tetrahydrofuran and 5 ml. of 2,3-dihydropyran, add 0.05 ml. of phosphorous oxychloride. Leave the mixture at room temperature for 3 hours, then pour it into ice water. Filter the resulting precipitate and purify by crystallization from acetone-hexane to give 3α-tetrahydropyranyloxy-D-nor-5α-pregnane-20-one.

C. 3α-TETRAHYDROPYRANYLOXY-D-NOR-ANDROSTANE-16β-OL 16-ACETATE

In a manner similar to that described in Example 17B, oxidize 3α-tetrahydropyranyloxy-D-nor-5α-prengnane-20-one with m-chloroperbenzoic acid and isolate the resulting product of 3α-tetrahydropyranyloxy-D-nor-androstane-16β-ol 16-acetate. Purify by crystallization from acetone-hexane.

D. 3α-TETRAHYDROPYRANYLOXY-D-NOR-ANDROSTANE-16β-OL

Reflux for 15 minutes a solution of 800 mgm. of 3α-tetrahydropyranyloxy-D-nor-androstane-16β-ol 16-acetate in 15 ml. of 5% potassium hydroxide in 90% aqueous methanol. Concentrate the solution to about half its original volume, then pour the residue into water. Filter the resulting precipitate, wash with water and dry to give 3α - tetrahydropyranlyoxy-D-nor-androstane-16β-ol. Purify by crystallization from aqueous methanol containing a drop of pyridine.

E. 3α-TETRAHYDROPYRANYLOXY-D-NOR-ANDROSTANE-16-ONE

Oxidize a solution of 500 mgm. of 3α-tetrahydropyranyloxy-D-nor-androstane-16β-ol in 5 ml. of pyridine with chromic acid-pyridine reagent (from 0.5 g. $Cr_2O_3$) according to the procedure of Example 9A. Purify the isolated product by crystallization from acetone-hexane to give 3α - tetrahydropyranyloxy-D-nor-androstane-16-one.

F. D-NOR-ANDROSTERONE (D-NOR-ANDROSTANE-3α-OL-16-ONE)

Reflux for 30 minutes a solution of 500 mgm. of 3α-tetrahydropyranyloxy-D-nor-androstane-16-one in 10 ml. ethanol containing 100 mgm. of p-toluenesulfonic acid. Cool the reaction mixture and pour into ice-water. Filter the resulting precipitate, wash well with water, then dry to give substantially D-nor-androstane-3α-ol-16-one. Purify by crystallization from ether-pentane.

EXAMPLE 20

*D-nor-19-nor-testosterone acetate*

A. D-NOR-19-NOR-5-ANDROSTENE-3β-OL-16β-CARBOXYLIC AICD 3-ACETATE

In the manner described in U.S. Patent No. 3,113,142 (1) treat 19-nor-5-androstene-3β-ol-17-one with potassium in t-butanol and isoamyl nitrite, then (2) treat the 16-oximino-19-nor-5-androstene-3β-ol - 17 - one produced thereby with chloramine in ether, and (3) esterify the thereby formed 16-diazo-19-nor-5-androstene-3β-ol-17-one by means of acetic anhydride in pyridine, then (4) irradiate the resulting 16-diazo-19-nor-5-androstene-3β-ol-17-one acetate in a dioxane-water solution with ultraviolet light to give D-nor-19-nor-5-androstene-3β-ol-16β-carboxylic acid 3-acetate.

B. D-NOR-19-NOR-5-PREGNENE-3β-OL-20-ONE 3-ACETATE

In a manner similar to that described in Examples 16A, 16C (alternate procedure) and 16D, (1) treat D-nor-19-nor-5-androstene-3β-ol-16β-carboxylic acid 3-acetate with oxalyl chloride and (2) treat the resulting D-nor-19-nor-5-androstene-3β-ol-16β-carboxylic acid chloride 3-acetate with dimethyl cadmium, then (3) hydrolyze the thereby formed D-nor-19-nor-5-pregnene-3β-ol-20-one 3-acetate by means of methanolic hydrochloric acid to give D-nor-19-nor-5-pregnene-3β-ol-20-one.

C. D-NOR-19-NOR-TESTOSTERONE ACETATE

In a manner similar to that described in Examples 17A–17D, (1) chlorinate D-nor-19-nor-5-androstene-3β-ol-16-one then, (2) oxidize the resulting 5,6-dichloro-D-nor-19-nor-pregnane-3β-ol-20-one with m-chloroperbenzoic acid, and (3) treat the 5,6-dichloro-D-nor-19-nor-androstane-3β,16β-diol 16-acetate thereby formed with sodium iodide in acetone, then (4) oxidize the resulting D-nor-19-nor-5-androstene-3β,16β-diol 16-acetate with chromic acid sulfuric acid reagent to give D-nor-19-nor-testosterone acetate.

I claim:
1. A compound having the following formula:

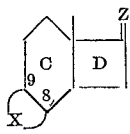

wherein Z is a member selected from the group consisting of keto (H, β-hydroxy) and (H, β-lower alkanoyloxy); and X represents an A and B-ring selected from the group consisting of

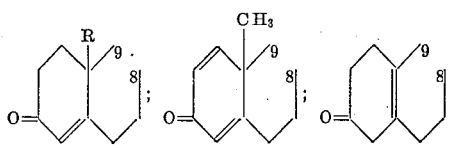

and

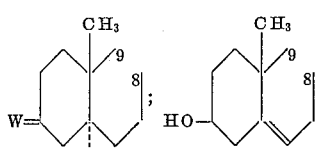

wherein R is a member selected from the group consisting of hydrogen and methyl; and W is a member selected from the group consisting of keto, (H, βOH), and (H, αOH).

2. D-nor-testosterone.
3. D-nor-testosterone propionate.
4. D-nor-4-androstene-3,16-dione.
5. D-nor-androstane-3β,16β-diol.
6. D-nor-androstane-3,16-dione.

References Cited by the Examiner

Meinwald, J., Curtis, G. G., and Gassman, P. G.: D-Norsteriods, J. Amer. Chem. Soc., vol. 84 (January 5, 1962), pages 115–116.

LORRAINE A. WEINBERGER, *Primary Examiner.*